United States Patent Office 3,563,665
Patented Feb. 16, 1971

---

3,563,665
OPTICAL SYSTEM FOR EXAMINING SURFACE PROFILES OF OBJECTS BY THE OPTICAL INTERSECTION METHOD
Kinji Takahashi, Yokohama-shi, and Jinichi Kato, Tokyo, Japan, assignors to Nippon Kogaku K.K., Tokyo, Japan, a corporation of Japan
Filed May 13, 1968, Ser. No. 728,392
Claims priority, application Japan, Feb. 7, 1968, 43/8,050; Mar. 22, 1968, 43/21,950
Int. Cl. G01b 11/30
U.S. Cl. 356—120     5 Claims

ABSTRACT OF THE DISCLOSURE

An optical system is provided for examining and photographing surface profiles of specimens by the optical intersection method. A slit element is provided for projecting light rays onto the surface of the specimen to be examined by a mirror or prism on the optical axis of an objective lens, through the objective lens and through a double pentaprism arrangement onto the specimen surface. The specimen reflected light rays again pass through the double prism arrangement and the objective lens to an eyepiece or the objective lens of a camera. The arrangement is such that the double pentaprism or the slit element is movable transversely relative to the optical axis.

---

This invention relates to a device for examining profiles of the surface of specimens by the optical intersection method wherein an illuminated plane section is made on the surface to be examined and this section observed or photographed.

In a conventional method for inspecting the surface of a specimen, a Schmarz type optical intersection surface inspector is widely used. The conventional surface inspector is inconvenient in use, particularly when continuous inspection is desired, since only one profile image can be obtained on a predetermined position in the focal plane. There were no means for obtaining continuous observations, or photographs, at different positions on the specimen surface, except by moving the specimen. The positioning of the specimen to obtain a series of profile images in the conventional devices was both complicated and inconvenient.

In the inspection of finished surfaces by means of the optical intersection method, it is possible to effectively observe an image of the finished surface in profile form when the illuminating light rays are at right angles to the optical axis of the objective lens.

In a conventional monocular microscope the optical axis of the objective is perpendicular to the surface of the object to be examined. When an objective lens of low power is used, the distance between the lens and the object examined is quite long. While it is possible to project illuminating light onto the surface of the object from a source provided about the objective lens, the light rays are incident at an angle to the optical axis of the lens so that an effective profile image of the surface of the object is not feasible. With the incident light rays at an angle to the optical axis, the reflected light rays are not effectively projected into the objective lens and with lenses of small effective apertures, the profile images observed are quite dark and hardly observable. With a lens of high magnification, the distance between the lens and the object becomes quite short so that it is impossible to insert another appropriate optical member to carry out effectively the optical intersection method.

An object of the present invention is to provide a tubular type profile intersection device in which the above mentioned defects are removed and wherein an objective lens of low magnification may be used effectively.

A further object of the invention is to provide a device of the general character indicated in which a double pentaprism arrangement or a slit plate is movable transversely relative to the optical axis to provide for continuous observations of the profile images.

The present invention will be more apparent from the following description referring to an illustrative embodiment shown in the attached drawing in which.

Figure 1:
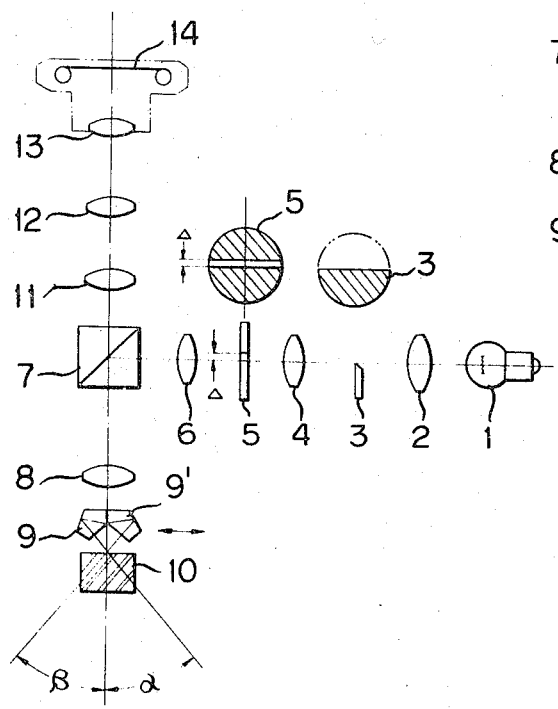
FIG. 1 shows an optical arrangement of an illustrative embodiment according to the present invention.

Referring now to FIG. 1, a light source for the device is provided in the form of a lamp 1, the light rays of which are directed through a condenser lens 2, and past a shielding plate 3 cutting off the light rays directed to half the illuminated field, the plate 3 being positioned where a stop is provided and a magnified image of the light source formed. The light rays from source 1 then pass through an intermediate auxiliary condenser lens 4 and through a slit 5 positioned where a field stop is positioned, the surface of a specimen 10 being illuminated by the light rays passing through the slit opening Δ. The light rays passing through the slit 5 then pass through an auxiliary lens 6 and fall upon a prism or semi-transparent mirror 7 angularly disposed with respect to the optical axis of an objective lens 8 through which the light rays are then directed. The objective lens 8 is an intermediate or low power magnifying lens preferably of long focal length.

Figure 3:
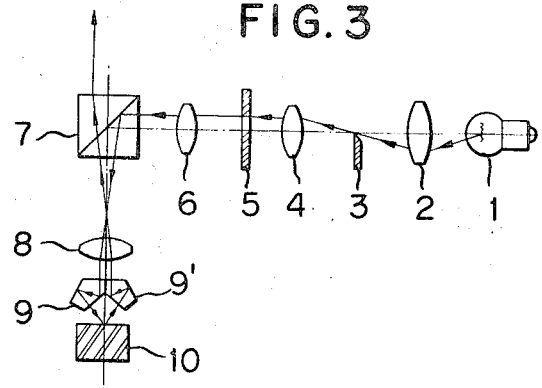
FIG. 3 shows a course of light rays at the light cutting.

A pair of pentaprisms 9, 9' is provided in the path of the light rays between the objective lens 8 and the specimen 10 to be inspected. The two prisms are cemented together so that the cemented surfaces are aligned with the objective axis and the surface adjacent the cemented surfaces of the respective prisms form a plane transverse to the objective axis. The light rays passing through the opening Δ of slit 5 enters the plane surface formed by the prisms perpendicularly (FIG. 3) and the specimen 10 is illuminated at a predetermined outgoing angle $\beta$ and at an incident angle $\alpha$ (FIG. 1) to provide for optical intersection. As illustrated in FIG. 3 the light rays pass through the prism 9, illuminate the specimen 10, and then pass through the prism 9'. Maximum brightness and magnification are obtainable when the incident angle $\alpha$ and the reflected angle $\beta$ are in the relationship of $\alpha+\beta=90°$, $\alpha=\beta=45°$.

The reflected light rays from the specimen 10 after passing through prism 9' is directed through the objective lens 8 and prism 9 through an auxiliary lens 11 and through lenses 12 and 13. The lens 12 and 13 may form an eyepiece or may form an objective lens for a camera illustrated in a phantom line provided with film 14.

Figure 4:
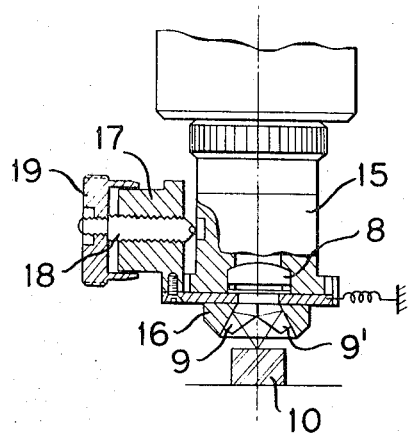
FIG. 4 is a partial lateral cross section showing a moving device of the pentaprisms of the embodiment of FIG. 1.
Figure 5:
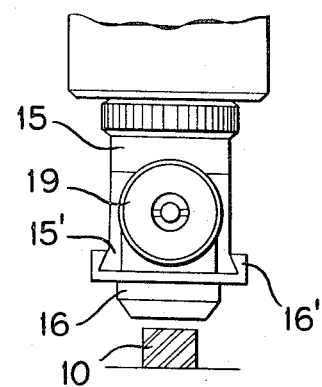
FIG. 5 shows a side appearance of FIG. 4.

Referring now to FIGS. 4 and 5, there is illustrated a mechanism for moving the pentaprisms 9, 9' transversely of the objective axis, the objective lens 8 being supported in a housing 15 to the bottom end of which is slidably mounted a frame 16 supporting the pentaprisms 9, 9'. The frame 16 is mounted on the housing 15 by means of dovetails 15', 16', the frame being slidable so that the line formed by the cemented surfaces of the prisms remains parallel with the rectangularly projected image of the opening Δ in slit plate 5. A micro-adjustment member 17 is secured to the frame 16 and is formed with a threaded opening which receives a threaded stem 18 secured to an adjustment knob 19. The end of the threaded stem 18 abuts the side of the housing 15 for sliding the frame back and forth, a spring being provided to return the frame to its initial position.

Figure 2:
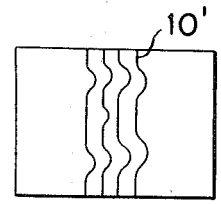
FIG. 2 shows a field view when a specimen is observed by the embodiment of the present invention.

When the light source 1 is turned on, the slit formed light rays incident on the specimen are observable as a profile section image 10' as illustrated in FIG. 2. As the pentaprisms 9, 9' are moved by the adjustment means described, parallel, succeeding images 10' are observable or can be photographed with the device described.

As previously indicated, it is possible to continuously observe or photograph the profile section image of the surface of a specimen without moving the specimen. The invention as described may readily be incorporated in tubular type profile intersection device and using intermediate or low power magnifying objectives which have hereunto been regarded as difficult to use in such devices.

It is also possible to incorporate this invention in a unit for attachment to a microscope or camera. As will hereinafter appear, the objective lens, eyepiece and semi-transparent mirror form the main optical system, while the light source, condenser lens, shielding plate and slit plate form an illuminating optical system, the axes of the respective systems being at right angles.

Figure 6:
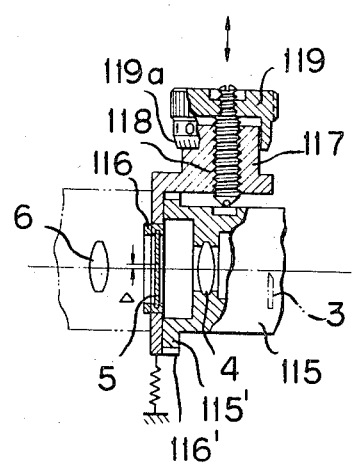
FIG. 6 is a partial cross section showing a moving device of the slit plate in place of moving the pentaprisms used in the embodiment of FIG. 1.
Figure 7:
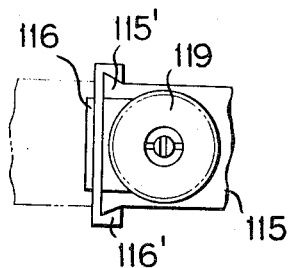
FIG. 7 is a side elevational view of FIG. 6.

In another embodiment of the invention as illustrated in FIGS. 6 and 7, the slit plate 5 is moved instead of the prisms 9, 9'. In this instance a housing 115 is provided for the slit illumination elements 1 through 4 and a slidable frame 116 supports the slit plate 5. The slidable frame is mounted on the housing 115 through dovetail connections 115' and 116', the frame 116 being movable transversely of the optical axis with the opening Δ moving parallel to a rectangular projection of the line formed by the cemented surfaces of the prisms 9, 9'. It is also possible to move the shielding plate 3 with the slit plate 5 to obtain an excellent profile image. As in the previous arrangement described an adjustment member 117 secured to the frame 115 is movable by a threaded stem 118 secured to an adjustment knob 119, the end of the stem abutting the housing with a spring returning the frame to its initial position.

With the rotation of the knob 119, the slit plate 5 is moved transversely in the direction indicated by the arrow in FIG. 6, the profile section images 10' of FIG. 2 being observed or photographed. In both embodiments, the degree of movement of the prisms 9, 9' or the slit plate 5 is determined by the degree of magnification or the size of the view. A scale 119' (FIG. 6) provided for the micro-adjustment will provide a reading of the amount of movement.

What is claimed is:

1. A device for examining the profile of a surface of a specimen by the optical intersection method, said device comprising a main optical system positioned along a principal optical axis inclding an objective, an eyepiece positioned to view said surface, and a semi-transparent mirror surface behind said objective and oblique to the principal optical axis of said main optical system;

an illuminating optical system including a light source, a condenser lens, a shield plate for cutting the light rays of the light source in half, and a slit plate disposed in the illuminating light path, both optical axes of said optical systems intersecting each other at said semi-transparent surface, the illumination light rays being reflected a half of the aperture of said objective and transmitted therethrough, and a pair of pentaprisms cemented together along one of the surfaces of each, the cemented surfaces formed being parallel to the slit of said slit plate and formed symmetrically to the principal optical axis and disposed between said objective and the specimen for directing the light rays from said light source passing through said slit plate and said objective to the surface of the specimen and directing the reflected light rays from the surface of the specimen to said eye piece through said objective and said semi-transparent mirror surface, each of said pentaprisms having a first reflecting surface facing the specimen and a second reflecting surface facing its first surface, both surfaces of each reflector being oblique to the principal optical axis at such angles that the included angle upon said surface between the incident ray and the reflected ray is substantially 90°.

2. A device according to claim 1, wherein carrying means supports the cemented pentaprisms to move said pentaprisms perpendicularly to the principal optical axis.

3. A device according to claim 1 wherein carrying means supports said slit plate for moving said slit plate perpendicularly to the illuminating optical axis.

4. A device according to claim 2, wherein a photographic device is provided behind the eyepiece for photographing successive profile images of the specimen surface.

5. A device according to claim 3, wherein a photographic device is provided behind the eyepiece for photographing successive profile images of the specimen surface.

References Cited

UNITED STATES PATENTS

| | | | |
|---|---|---|---|
| 1,806,621 | 5/1931 | Forrest | 350—204X |
| 2,216,003 | 9/1940 | Eppenstein et al. | 356—237X |

FOREIGN PATENTS

| | | | |
|---|---|---|---|
| 1,207,686 | 9/1959 | France | 356—109 |
| 165,904 | 3/1965 | U.S.S.R. | 356—120 |

RONALD L. WIBERT, Primary Examiner

T. MAJOR, Assistant Examiner

U.S. Cl. X.R.

356—237